(12) United States Patent
Wu

(10) Patent No.: US 12,721,310 B1
(45) Date of Patent: Sep. 1, 2026

(54) PET WATER FOUNTAIN WITH CLEAN AND DIRTY WATER SEPARATION

(71) Applicant: Shenzhen Petemeng Creative Technology Co., Ltd., Shenzhen (CN)

(72) Inventor: Danyang Wu, Shenzhen (CN)

(73) Assignee: Shenzhen Petemeng Creative Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/292,958

(22) Filed: Aug. 7, 2025

(30) Foreign Application Priority Data

Mar. 26, 2025 (CN) ......................... 202510376928.8

(51) Int. Cl.
*A01K 7/02* (2006.01)

(52) U.S. Cl.
CPC .................................... *A01K 7/025* (2013.01)

(58) Field of Classification Search
CPC ...................................................... A01K 7/025
See application file for complete search history.

(56) References Cited

U.S. PATENT DOCUMENTS 3,101,071 A * 8/1963 Frye ......................... A01K 7/04 119/74
2004/0134439 A1 * 7/2004 Flowers ................... A01K 7/02 119/69.5

FOREIGN PATENT DOCUMENTS

CN 105660438 A * 6/2016 ............... A01K 7/00
GB 2268868 A * 1/1994 ............... A01K 7/00
WO WO-2025020341 A1 * 1/2025 ............. A01K 7/025

OTHER PUBLICATIONS

Machine Translation of WO-2025020341-A1, Wang, Lijun, Jan. 30, 2025 (Year: 2025).*
Machine Translation of CN-105660438-A, Li, Hang-fan, Jun. 15, 2016 (Year: 2016).*

* cited by examiner

*Primary Examiner* — Kimberly S Berona
*Assistant Examiner* — Katherine June Walter
(74) *Attorney, Agent, or Firm* — Jose Cherson Weissbrot

(57) ABSTRACT

The present invention discloses a pet water fountain with clean and dirty water separation, including a shell, a clean water tank, a dirty water tank, a water outlet tube, a water pump, a drinking tray assembly, a rotating member, and a driving member. The clean water tank and the dirty water tank are arranged on two sides of the shell. The water outlet tube is mounted on the shell and located above the dirty water tank. The water pump is arranged inside the shell and connected to the clean water tank and the water outlet tube respectively through a communicating tube. The drinking tray assembly is rotatably arranged on the shell and located below the water outlet tube. The rotating member includes a rotating sleeve and a swing arm connected thereto. The present invention ensures clean and dirty water separation, and a clean water source for pets to drink.

10 Claims, 5 Drawing Sheets

PET WATER FOUNTAIN WITH CLEAN AND DIRTY WATER SEPARATION

TECHNICAL FIELD

The present invention relates to the technical field of pet supplies, and more particularly, to a pet water fountain with clean and dirty water separation.

BACKGROUND ART

As important equipment in modern pet breeding, a pet water fountain has a main function of providing a convenient drinking service for pets and ensuring the cleanliness and hygiene of the water source. However, in the current market of pet water fountains, despite the existence of various brands and models, most of them still face a common technical problem—the inability to achieve the function of clean and dirty water separation.

Conventional pet water fountains are typically designed with only a single water tank for storing and supplying drinking water. A major problem caused by this design is that pets may carry impurities such as hair and food debris into the water tank during drinking, and these impurities may mix with the water, which not only affects the water quality, but may also act as a hotbed for bacterial growth. In addition, the conventional water fountain requires frequent overall cleaning due to the inability to effectively separate clean water from dirty water, which not only increases the maintenance burden of the user, but also may lead to further deterioration of the water quality due to the lack of timely cleaning.

In order to achieve clean and dirty water separation, some pet water fountains on the market attempt to employ additional filtration devices or separation structures. However, these attempts tend to suffer from a number of deficiencies. For example, the scenario that some filtration devices, although capable of removing some impurities, cannot completely solve the separation problem of larger particles such as hair; and some separation structures may not be widely used because of their complex design, difficult maintenance, or poor performance.

Therefore, there is an urgent need in the market for a pet water fountain capable of achieving true clean and dirty water separation. Such a water fountain needs to be able to automatically and effectively separate clean water from the dirty water, thereby ensuring that the pet is always drinking a clean and fresh source of water. At the same time, in order to reduce the user's maintenance costs and improve the convenience of use, the new water fountain design should also consider the needs such as easy cleaning and maintenance, and intelligent management.

In view of the above, the present patent intends to propose an innovative pet water fountain design, so as to overcome the shortcomings of the existing pet water fountains in clean and dirty water separation, and to provide a healthier and more convenient drinking environment for pets.

SUMMARY OF THE INVENTION

The main object of the present invention is to provide a pet water fountain with clean and dirty water separation, so as to achieve clean and dirty water separation and provide a healthier and more convenient drinking environment for pets.

In order to achieve the above objective, the present invention proposes a pet water fountain with clean and dirty water separation, which includes: a shell, a clean water tank, a dirty water tank, a water outlet tube, a water pump, a drinking tray assembly, a rotating member, and a driving member. The clean water tank is arranged on one side of the shell, and the dirty water tank is arranged on the other side of the shell. The water outlet tube is mounted on the shell and is located above the dirty water tank. The water pump is arranged inside the shell and is connected to the clean water tank and the water outlet tube respectively via a communicating tube. The drinking tray assembly is rotatably arranged on the shell, and is located below the water outlet tube and above the dirty water tank. The rotating member is rotatably arranged on the shell. The driving member is arranged inside the shell and is in transmission connection with the rotating member.

The rotating member comprises a rotating sleeve and a swing arm connected thereto, the rotating sleeve being rotatably arranged on the shell, the swing arm having a sliding rod, the drinking tray assembly having a sliding rail groove adapted to the sliding rod, and the drinking tray assembly having a rotating shaft inserted into the shell; and the driving member drives the rotating member to rotate, causing the sliding rod to slide along the sliding rail groove and the drinking tray assembly to rotate around the rotating shaft, so as to pour dirty water in the drinking tray assembly into the dirty water tank.

In an implementation mode, the drinking tray assembly comprises a bottom shell and a water holding tray, with the water holding tray mounted on the bottom shell, and the rotating shaft is connected to the bottom shell, extends into the shell, and is rotatably mounted on the shell.

In an implementation mode, the pet water fountain with clean and dirty water separation further comprises a fixed block arranged inside the shell and a rotating block rotatably connected to the fixed block, wherein the shell has a first through-hole portion at a position corresponding to the fixed block, the rotating block passing through the first through-hole portion, and the rotating shaft being sleeved on the rotating block.

In an implementation mode, the pet water fountain with clean and dirty water separation further comprises a locking block for locking the rotating shaft from the outside, wherein the locking block is in a flat-axle shape, and the rotating shaft has a flat hole for mounting the rotating block.

In an implementation mode, the shell further has a second through-hole portion, the rotating sleeve is inserted into the second through-hole portion, and the second through-hole portion is located to a side of the first through-hole portion.

In an implementation mode, the water outlet tube is located on a side of the first through-hole portion away from the second through-hole portion.

In an implementation mode, the water outlet of the water outlet tube is in the shape of a straight line.

In an implementation mode, the dirty water tank comprises a bottom cylinder and a cover plate, and the cover plate is placed on the bottom cylinder; the cover plate comprises a flat plate portion and a concave plate portion, and the concave plate portion is recessed downward to provide a space for the drinking tray assembly to rotate; and the concave plate portion has a plurality of water leakage grooves.

In an implementation mode, a portion of the bottom shell abuts against the flat plate portion.

In an implementation mode, the pet water fountain with clean and dirty water separation further comprises a control board and a touch screen, wherein the control board is arranged inside the shell and is electrically connected to the driving member; and the touch screen is electrically connected to the control board and is located outside the shell for an operation by a user.

The pet water fountain with clean and dirty water separation according to the technical solutions of the present invention is used to overcome the deficiencies of the existing pet water fountains in clean and dirty water separation and provide a healthier and more convenient drinking environment for pets.

BRIEF DESCRIPTION OF THE DRAWINGS

In order to explain the embodiments of the present invention or the technical solutions in the prior art more clearly, the following will briefly introduce the drawings needed in the embodiments and the prior art. Obviously, the drawings in the following description are only some embodiments of the present invention. For those of ordinary skills in the art, without involving creative efforts, other drawings can be obtained from the structures shown in these drawings.

DESCRIPTION OF REFERENCE NUMERALS

Figure 1:
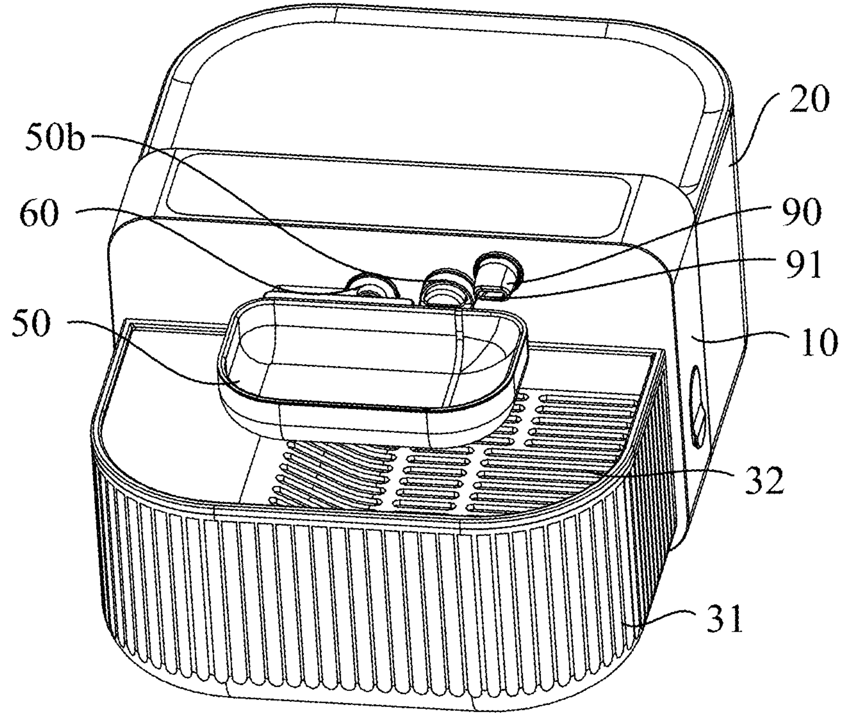
FIG. 1 is a schematic view showing a structure of an embodiment of a pet water fountain with clean and dirty water separation according to the present invention.

10, shell; 11, fixed block; 12, rotating block; 13, control board; 14, touch screen; 15, locking block; 10*a*, first through-hole portion; 10*b*, second through-hole portion; 10*c*, first outer surface; 10*d*, second outer surface; 20, clean water tank; 30, dirty water tank; 31, bottom cylinder; 32, cover plate; 321, flat plate portion; 322, concave plate portion; 323, water leakage groove; 40, water pump; 50, drinking tray assembly; 50*a*, sliding rail groove; 50*b*, rotating shaft; 50*c*, flat hole; 51, bottom shell; 52, water holding tray; 60, rotating member; 61, rotating sleeve; 62, swing arm; 621, sliding rod; 70, driving member; 80, communicating tube; 90, water outlet tube; and 91, water outlet.

DETAILED DESCRIPTION OF THE INVENTION

The technical solutions in the embodiments of the present invention will be clearly and completely described below in conjunction with the accompanying drawings in the embodiments of the present invention. Obviously, the described embodiments are merely a part of the embodiments of the present invention, rather than all the embodiments. Based on the embodiments of the present invention, all other embodiments obtained by one of ordinary skill in the art without involving any inventive efforts are within the scope of the present invention.

It needs to be noted that, if a directivity indication (such as up, down, left, right, front, rear . . . ) is involved in an embodiment of the present invention, the directivity indication is only used to explain the relative positional relationship, movement condition, etc. between components in a specific posture. If the specific posture is changed, the directivity indication is changed accordingly.

In addition, if there is a description of "first", "second", etc. in an embodiment of the present invention, the description of "first", "second", etc. is for descriptive purposes only and is not to be construed as indicating or implying a relative importance or implicitly indicating the number of technical features indicated. Therefore, a feature defined as "first" or "second" may explicitly or implicitly comprise at least one of the features. Besides, to the extent that "and/or" appears throughout, it is intended to include each of the three listed alternatives. For instance, the scenario that "A and/or B" is intended to include solution A, or solution B, or a solution that both A and B meet the standard. In addition, the technical solutions between the various embodiments can be combined with each other, but must be based on what ordinary technical personnel in the art can achieve. When the combination of technical solutions conflicts or cannot be achieved, it should be considered that the combination of such technical solutions does not exist and is not within the scope of protection claimed by the present invention.

Referring to FIGS. 1 to 6, a pet water fountain with clean and dirty water separation provided in an embodiment of the present application includes a shell 10, a clean water tank 20, a dirty water tank 30, a water outlet tube 90, a water pump 40, a drinking tray assembly 50, a rotating member 60 and a driving member 70. The clean water tank 20 is provided at one side of the shell 10, and the dirty water tank 30 is provided at the other side of the shell 10. A water outlet tube 90 is mounted on the shell 10 above the dirty water tank 30. The water pump 40 is provided inside the shell 10, and the water pump 40 is connected to the clean water tank 20 and the water outlet tube 90 via the communicating tube 80, respectively. The drinking tray assembly 50 is rotatably arranged on the shell 10, and the drinking tray assembly 50 is arranged below the water outlet tube 90 and above the dirty water tank 30. The rotating member 60 is rotatably arranged on the shell 10, the driving member 70 is arranged inside the shell 10, and the driving member 70 is drivingly connected to the rotating member 60. The rotating member 60 includes a rotating sleeve 61 and a swing arm 62, and the swing arm 62 is connected to the rotating sleeve 61. The swing arm 62 has a sliding rod 621, the drinking tray assembly 50 has a sliding rail groove 50*a* adapted to the sliding rod 621, and the drinking tray assembly 50 also has a rotating shaft 50*b* inserted into the shell 10. In this embodiment, the driving member 70 drives the rotating member 60 to rotate, causing the sliding rod 621 to slide along the sliding rail groove 50*a* and the drinking tray assembly 50 to rotate around the rotating shaft 50*b*, thereby pouring the dirty water in the drinking tray assembly 50 into the dirty water tank 30.

Specifically, in this embodiment, the shell 10 is a square box with a first outer surface 10*c* and a second outer surface 10*d* oppositely arranged. The clean water tank 20 and the dirty water tank 30 are respectively arranged on the first outer surface 10*c* and the second outer surface 10*d* of the shell 10. The shell 10 has an accommodating space inside to accommodate the water pump 40 and the communicating tube 80. The water pump 40 is fixedly mounted inside the shell 10, and the water inlet end of the water pump 40 is connected to the bottom of the clean water tank 20 through the communicating tube 80 to extract clean water from the clean water tank 20. The water outlet end of the water pump 40 is connected to the water outlet tube 90 mounted on the shell 10 through another communicating tube 80 to discharge clean water. The drinking tray assembly 50 is arranged below the water outlet tube 90 and above the dirty water tank 30. The drinking tray assembly 50 is rotatably arranged. The water pump 40 pumps water from the clean water tank 20 and directs it into the drinking tray assembly 50 below for the pet to drink. The rotating member 60 is rotatably arranged on a second outer surface of the shell 10.

The rotating member 60 includes an integrally formed rotating sleeve 61 and swing arm 62. The rotating sleeve 61 is rotatably arranged on the second outer surface 10*d* of the shell 10. The swing arm 62 has a straight rod structure, with one end connected to the rotating sleeve 61 and the other end extending parallel to the direction of the second outer surface 10*d*. The swing arm 62 has a sliding rod 621 perpendicular to it. The drinking tray assembly 50 has a sliding rail groove 50*a* parallel to the swing arm 62. The sliding rod 621 is perpendicular to the swing arm 62 and inserted into the sliding rail groove 50*a*. The drinking tray assembly 50 has a rotating shaft 50*b* whose axis is parallel to the axes of the rotating sleeve 61 and the sliding rod 621. During the operation of the device, the driving member 70 drives the rotating member 60 to rotate, causing the sliding rod 621 of the rotating member 60 to slide along the sliding rail groove 50*a* and, at the same time, causing the drinking tray assembly 50 to rotate around the rotating shaft 50*b*, thereby pouring the dirty water in the drinking tray assembly 50 into the dirty water tank 30 below.

This application maintains the stability and guidance of the drinking tray assembly 50 during its rotation by providing the rotating member 60, and the rotating shaft 50*b* on the drinking tray assembly 50. The sliding rod 621 slides along the sliding rail groove 50*a*, ensuring that the drinking tray assembly 50 can rotate smoothly around the rotating shaft 50*b*. The rotating shaft 50*b* is the center point of rotation for the drinking tray assembly 50, and the sliding rod 621 forms another support point with the drinking tray assembly 50 during rotation. These two support points together ensure the stability and balance of the drinking tray assembly 50 during rotation. By means of clever connection and arrangement, this application jointly achieves the clean and dirty water separation function of a pet water fountain while ensuring the convenience and cleanliness of pet drinking water. The drinking tray assembly has two support points, which also ensure the stability of the drinking tray assembly during the pet's drinking process. It needs to be noted that in this embodiment, the driving member 70 is a motor.

Figure 6:
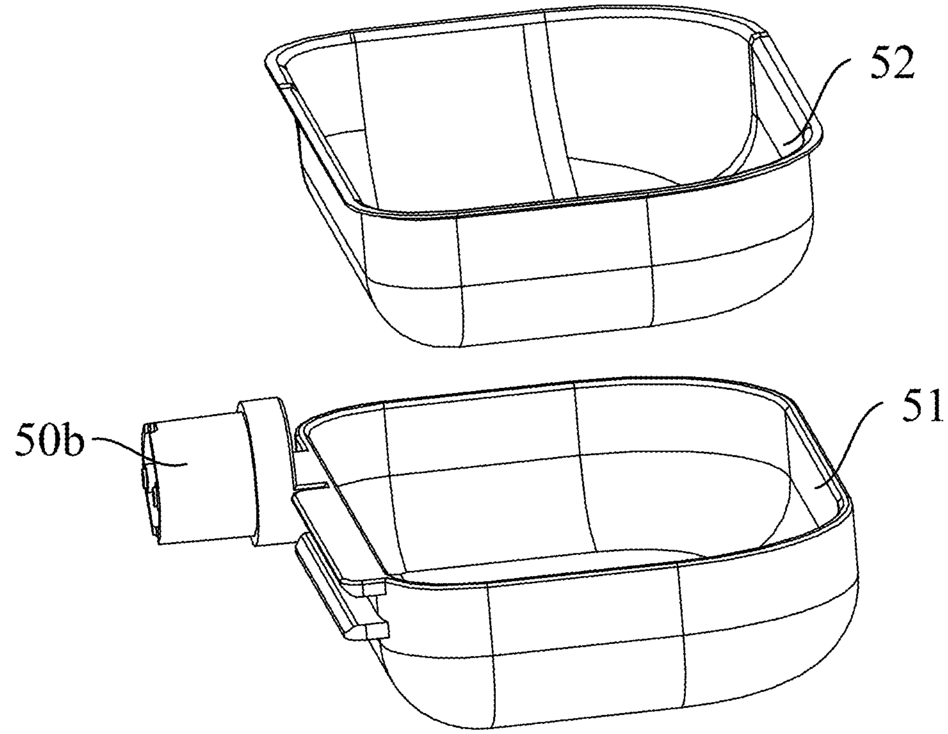
FIG. 6 is a schematic view showing an exploded structure of a drinking tray assembly according to an embodiment of a pet water fountain with clean and dirty water separation of the present invention.

Referring to FIG. 6, in an alternative embodiment, the drinking tray assembly 50 includes a bottom shell 51 and a water holding tray 52 mounted on the bottom shell 51. The rotating shaft 50*b* is arranged on the bottom shell 51, extends inward into the shell 10, and is rotatably mounted to the shell 10.

Specifically, in this embodiment, the drinking tray assembly 50 includes a bottom shell 51 and a water holding tray 52 assembled with each other. The bottom shell 51 is a cavity member, and the water holding tray 52 is also a cavity. The outline dimension of the water holding tray 52 is adapted to the size of the cavity of the bottom shell 51, allowing the water holding tray 52 to be directly placed on the bottom shell 51. The water holding tray 52 is used to hold water for the pet to drink. After a long time, the clean water in the water holding tray 52 will become dirty water. At this time, it is necessary to rotate the drinking tray assembly 50 to drive the water holding tray 52 to rotate by a certain angle, so that the dirty water can be poured into the dirty water tank 30 below. After the dirty water tank 30 is full of dirty water, the user can disassemble the dirty water tank 30 and pour out the dirty water inside for continued storage of dirty water. The rotating shaft 50*b* is located on the outer wall of the bottom shell 51, extends toward the second outer surface 10*d* of the shell 10 to be inserted into the shell 10, and is rotatably arranged. In this application, the water holding tray 52 is detachably arranged on the bottom shell 51. The user can periodically take the water holding tray 52 out of the bottom shell 51 for cleaning to avoid the accumulation of dirt in the water holding tray 52. In this embodiment, the water holding tray 52 is made of metal material. Metal materials generally have high strength and durability to withstand the wear and impact of daily use. The surface of metal is relatively smooth and not prone to dirt and bacteria. By using appropriate cleaning agents and tools, the metal water holding tray 52 can be easily cleaned to ensure the hygiene and safety of the pet's drinking water.

Figure 3:
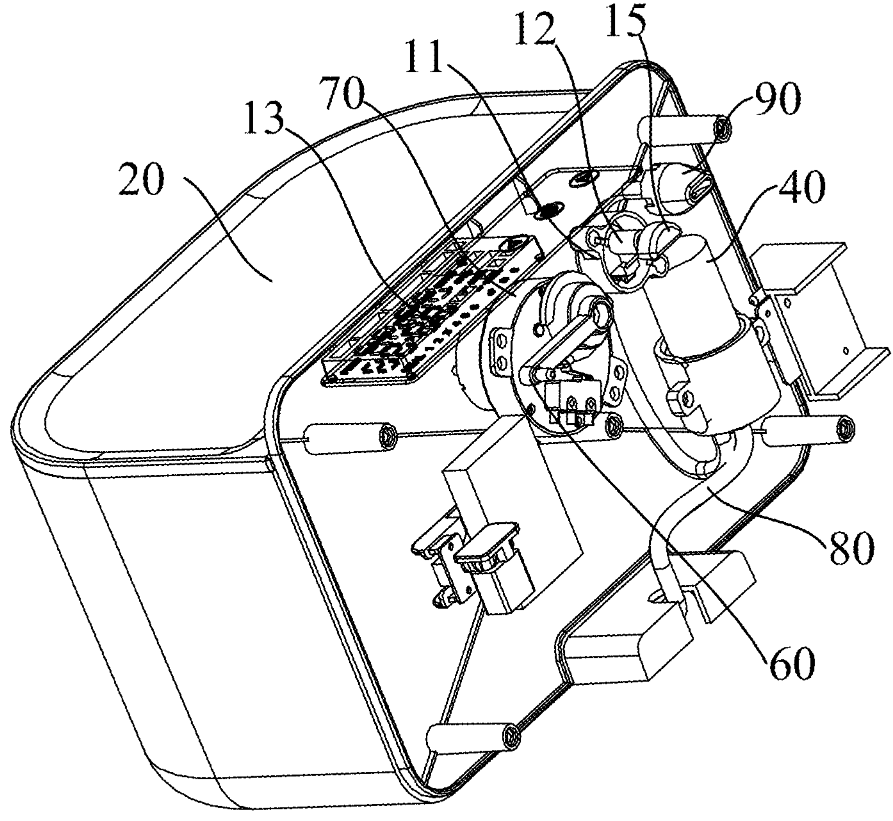
FIG. 3 is a schematic view showing a partial structure of an embodiment of a pet water fountain with clean and dirty water separation according to the present invention.
Figure 4:
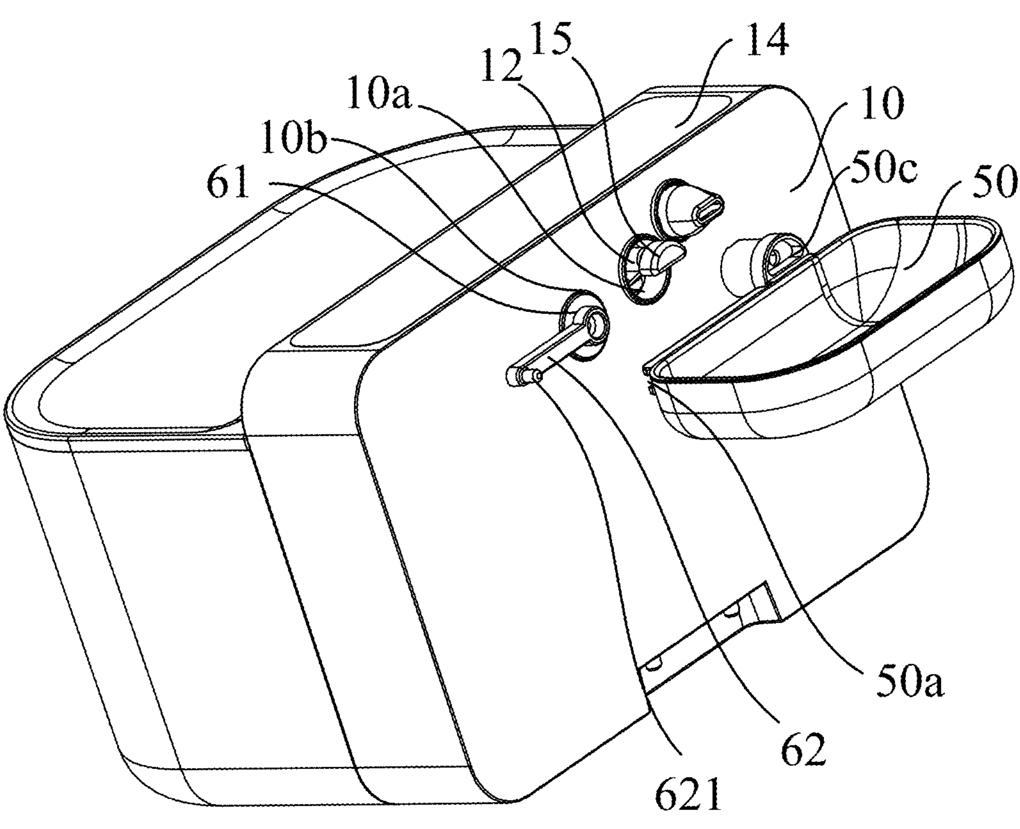
FIG. 4 is a schematic view showing an exploded structure of a position of a drinking tray assembly in accordance with one embodiment of a pet water fountain with clean and dirty water separation according to the present invention.

Referring to FIGS. 3 and 4, in an optional embodiment, the pet water fountain with clean and dirty water separation further includes a fixed block 11 arranged inside the shell 10 and a rotating block 12 rotatably connected to the fixed block 11. The shell 10 has a first through-hole portion 10*a* at a position corresponding to the fixed block 11. The rotating block 12 passes through the first through-hole portion 10*a*, and the rotating shaft 50*b* is sleeved on the rotating block 12.

Specifically, the pet water fountain with clean and dirty water separation of this application further includes a fixed block 11 and a rotating block 12. The fixed block 11 is mounted inside the shell 10, and the rotating block 12 is rotatably connected to the fixed block 11. The shell 10 has a first through-hole portion 10*a* provided right opposite to the rotating block 12. The rotating block 12 passes through the first through-hole portion 10*a*, and the rotating shaft 50*b* is inserted into the first through-hole portion 10*a* and sleeved on the rotating block 12. The rotating block 12 can rotate freely with respect to the fixed block 11, which allows the drinking tray assembly 50 to be easily rotated to pour out dirty water when required. At the same time, the sleeved connection between the rotating block 12 and the rotating shaft 50*b* also provides sufficient flexibility for the free rotation of the rotating shaft 50*b*. The pet water fountain with clean and dirty water separation of this invention provides a more stable and flexible support for the rotation of the drinking tray assembly 50 by incorporating the structure of the fixed block 11 and the rotating block 12. This design not only improves the stability and accuracy of the rotation of the drinking tray assembly 50 but also facilitates the disengagement and insertion of the drinking tray assembly 50 as a whole from and into the first through-hole portion 10*a*, making it convenient for the user's post-cleaning work and the reassembly of the drinking tray assembly 50.

Referring again to FIGS. 3 and 4, in an optional embodiment, the pet water fountain with clean and dirty water separation further includes a locking block 15 for locking the rotating shaft 50*b* from one side of the rotating shaft 50*b* away from the fixed block 11. The locking block 15 is in a flat-axle shape, and the rotating shaft 50*b* has a flat hole 50*c* for mounting the locking block 15.

Specifically, in this embodiment, one locking block 15 with a flat-axle shape is further mounted on the rotating shaft 50*b*. This design ensures the fixation stability of the rotating shaft 50*b* and facilitates the connection between the locking block 15 and the rotating shaft 50*b*. The rotating block 12 is rotatably connected to the fixed block 11 and passes through the first through-hole portion 10*a* of the shell 10. The locking block is externally mounted on the rotating block 12, connecting the drinking tray assembly 50 to the shell. The rotating shaft 50*b* has a flat hole 50*c* for mounting the locking block, and the shape of the flat hole 50*c* matches that of the flat-axle shape of the rotating block 12. The rotating shaft 50*b* is sleeved on the rotating block 12 and serves as a central shaft for the rotation of the drinking tray assembly 50. The locking block has a flat-axle shape that matches the flat hole 50*c* of the rotating shaft 50*b*, thereby enhancing the stability of the connection, reducing shaking and noise during the rotation, ensuring the installation and positioning of the drinking tray assembly 50, and playing a fool-proof role to ensure that the user does not mount the drinking tray assembly 50 to the wrong direction during the assembly. At that, it ensures that the opening of the water holding tray 52 is arranged upward.

Referring to FIG. 4, in an alternative embodiment, the shell 10 further has a second through-hole portion 10*b* into which the rotating sleeve 61 is inserted, and the second through-hole portion 10*b* is located to the side of the first through-hole portion 10*a*.

Specifically, in this embodiment, the shell 10 further has a second through-hole portion 10*b* for mounting the rotating sleeve 61, with the second through-hole portion 10*b* being located to the side of the first through-hole portion 10*a*. The shape and size of the second through-hole portion 10*b* are perfectly adapted to the outline and size of the rotating sleeve 61 so that the rotating sleeve 61 can rotate freely on the shell 10. Since the second through-hole portion 10*b* is located to the side of the first through-hole portion 10*a*, this arrangement avoids direct interference between the rotating member 60 and the drinking tray assembly 50, making the assembly process smoother and facilitating subsequent maintenance and cleaning. After the rotating sleeve 61 is inserted into the second through-hole portion 10*b*, it is sleeved on the rotating shaft of the driving member 70 to achieve a tight connection with the rotating shaft. This design ensures efficient transmission of the driving force, reduces energy losses, and improves the efficiency of the overall transmission system. At the same time, the rotating sleeve 61 directly penetrates into the second through-hole portion 10*b* and is sleeved on the rotating shaft, which is also convenient for later disassembly and assembly, and facilitates cleaning by the user.

In an alternative embodiment, the water outlet tube 90 is located on a side of the first through-hole portion 10*a* remote from the second through-hole portion 10*b*.

Specifically, in this embodiment, the water outlet tube 90 is neatly designed on one side of the first through-hole portion 10*a* remote from the second through-hole portion 10*b*. This layout is based on an in-depth consideration of the use of the interior space of the product, intending to optimize the water flow path, reduce the mutual interference of the internal structures, and improve the overall aesthetics and practicality. Locating the water outlet tube 90 on a side away from the second through-hole portion 10*b* helps to ensure that the water flows smoothly to the pet drinking area after leaving the clean water tank 20 without being obstructed by moving parts such as the rotating member 60 or the driving member 70. This helps to improve the stability and efficiency of the water flow and ensures that pets can continue to have access to clean, fresh drinking water. This arrangement also takes full advantage of the space available within the shell 10, avoiding overcrowding between the internal components. This not only helps to increase the overall structural strength of the product, but also provides more convenience for subsequent maintenance and cleaning.

In this embodiment, the rotating sleeve 61 and the rotating shaft 50*b* are located on two sides of the midline of the length of the drinking tray assembly 50. Locating the rotating sleeve 61 and the rotating shaft 50*b* on two sides of the midline of the length of the drinking tray assembly 50, respectively, helps to achieve better balance during rotation. This balance is essential to reduce sloshing and to improve the smoothness of the rotation, thus ensuring the pet's comfort and safety in drinking water.

Referring to FIG. 1, in an alternative embodiment, the shape of the water outlet 91 of the water outlet tube 90 is a straight line.

Specifically, the water outlet tube 90 has a water outlet 91, and the shape of the water outlet 91 is a straight line. The design of the water outlet 91 in a straight line helps to more accurately control the flow rate and direction of the water flow. Compared with other shapes of the water outlet 91, the straight-line water outlet 91 can distribute the water flow more evenly, reduce the splashing and waste of the water flow, and ensure that pets can drink water stably and comfortably.

Figure 5:
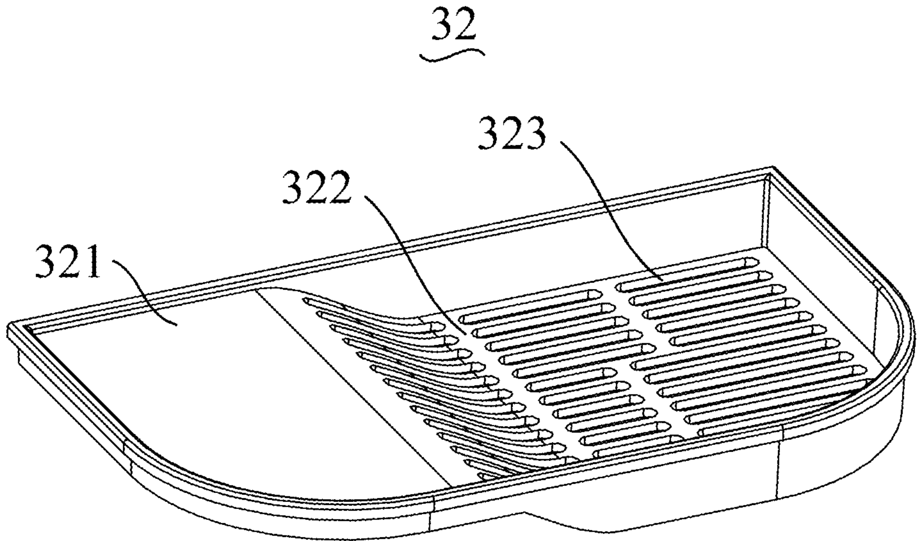
FIG. 5 is a schematic view showing a structure of a cover plate of an embodiment of a pet water fountain with clean and dirty water separation according to the present invention.

Referring to FIGS. 1 and 5, in an alternative embodiment, the dirty water tank 30 includes a bottom cylinder 31 and a cover plate 32, the cover plate 32 covering the bottom cylinder 31. The cover plate 32 comprises a flat plate portion 321 and a concave plate portion 322, wherein the concave plate portion 322 is recessed downwards so as to provide a space for the rotation of the drinking tray assembly, and the concave plate portion 322 has a plurality of water leakage grooves 323.

Specifically, in the present embodiment, the dirty water tank 30 includes two parts, a bottom cylinder 31 and a cover plate 32. The bottom cylinder 31 serves as a main container for dirty water collection, and the cover plate 32 covers the bottom cylinder 31 to form a closed and easy-to-maintain space. The cover plate 32 includes two portions, a flat plate portion 321 and a concave plate portion 322. The concave plate portion 322 is downwardly recessed, which ingeniously provides the space required for the drinking tray assembly 50 to rotate to pour the dirty water, ensures smooth rotation of the drinking tray assembly 50, and ensures smooth and efficient discharge of the dirty water. The concave plate portion 322 is carefully provided with a plurality of water leakage grooves 323. These water leakage grooves 323 not only serve to guide the inflow of the dirty water into the bottom cylinder 31, but also effectively prevent the accumulation and overflow of the dirty water on the cover plate 32 by the rational arrangement of the number and the position of the water leakage grooves. Since the cover plate 32 is detachably connected to the bottom cylinder 31, a user can easily remove the cover plate 32 and thoroughly clean and maintain the bottom cylinder 31 when it is necessary for a user to clean or replace the dirty water tank 30.

Referring again to FIG. 1, in an alternative embodiment, a portion of the bottom shell 51 abuts the flat plate portion 321.

Specifically, in the present embodiment, the bottom shell 51 is an important component of the drinking tray assembly 50, and a portion of it is ingeniously designed to abut against the flat plate portion 321 of the dirty water tank 30. The design of the abutment of the bottom shell 51 with the flat plate portion 321 provides a firm point of support for the drinking tray assembly 50 to increase the smoothness of the drinking tray assembly 50 when water is consumed by a pet. This design effectively prevents the drinking tray assembly from sloshing or tilting during the pet's drinking process by providing a stable support point, thereby ensuring the pet's drinking comfort and safety.

Figure 2:
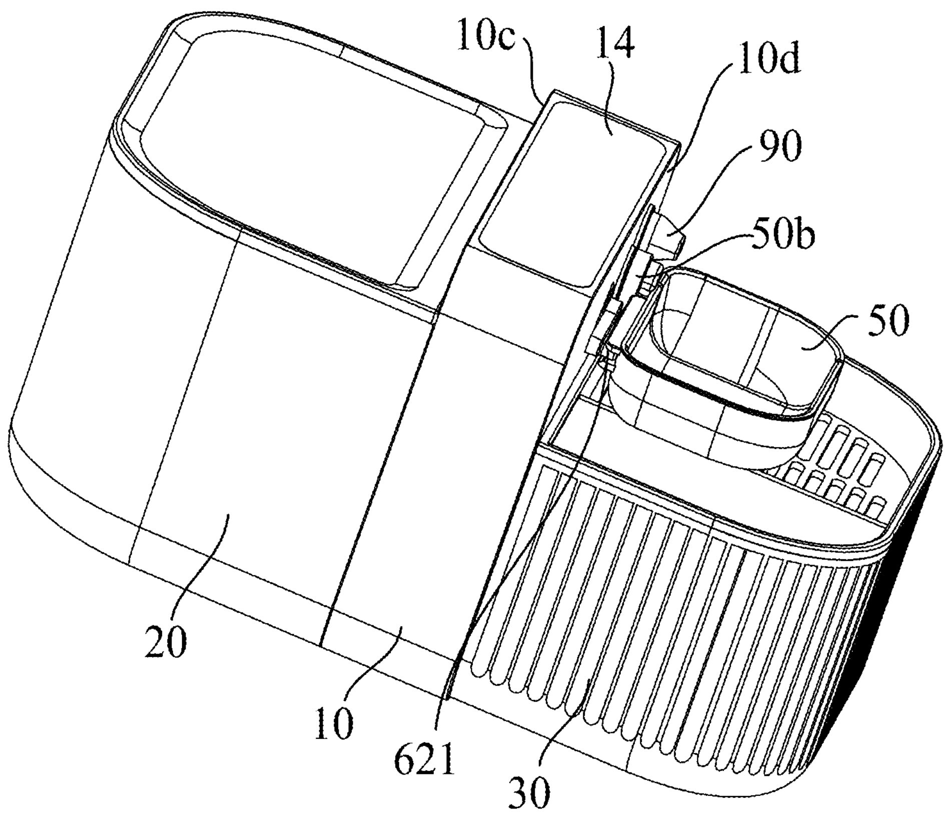
FIG. 2 is another schematic view showing a structure of an embodiment of a pet water fountain with clean and dirty water separation according to the present invention.

Referring to FIGS. 2 and 3, in an alternative embodiment, the pet water fountain with clean and dirty water separation further includes a control board 13 and a touch screen 14. The control board 13 is arranged in the shell 10, and is electrically connected to the driving member 70; and the touch screen 14 is electrically connected to the control board 13, and is located outside the shell 10 for a user to operate.

Specifically, in this embodiment, the pet water fountain with clean and dirty water separation incorporates a core component, the control board 13. The control board 13 is neatly provided in the shell 10 and is electrically connected to the driving member 70. This design enables the control board 13 to precisely control the operation of the driving member 70, thereby ensuring that the drinking tray assembly 50 can rotate and dump water in accordance with a preset program, and enabling the automatic operation of the water fountain. For example, the scenario that a user may set a timing dumping of dirty water, a dumping of dirty water every 6 hours, etc. In order to improve the convenience and intuitiveness of user operation, a human-computer interaction interface of a touch screen 14 is also added in this embodiment. The touch screen 14 is electrically connected to the control board 13, and is skillfully mounted outside the shell 10 so as to make it convenient for a user to observe and operate. Through the buttons or icons on the touch screen 14, a user can easily set various functions and monitor the status of the water fountain, such as adjusting the rotation speed, setting the timing for dumping dirty water, etc. In the present embodiment, the touch screen 14 is provided on the upper surface of the shell 10. This design allows users to visually see various buttons, icons, and information on the touch screen 14, making operations easier.

The above description is only an exemplary implementation mode of the present invention and does not limit the patent scope of the present invention. Any equivalent structural transformation made under the technical concept of the present invention using the content of the description and drawings of the present invention, or directly/indirectly applied in other related technical fields, is included in the patent protection scope of the present invention.

The invention claimed is:

1. A pet water fountain with clean and dirty water separation, comprising a shell;

a clean water tank arranged on one side of the shell;

a dirty water tank arranged on the other side of the shell;

a water outlet tube mounted on the shell and located above the dirty water tank;

a water pump arranged inside the shell, the water pump being connected to the clean water tank and the water outlet tube respectively through a communicating tube;

a drinking tray assembly rotatably arranged on the shell, the drinking tray assembly being arranged below the water outlet tube and above the dirty water tank;

a rotating member rotatably arranged on the shell; and a driving member arranged inside the shell and in transmission connection with the rotating member;

wherein the rotating member comprises a rotating sleeve and a swing arm connected thereto, the rotating sleeve being rotatably arranged on the shell, the swing arm having a sliding rod, the drinking tray assembly having a sliding rail groove adapted to the sliding rod, and the drinking tray assembly having a rotating shaft inserted into the shell; and the driving member drives the rotating member to rotate, causing the sliding rod to slide along the sliding rail groove and the drinking tray assembly to rotate around the rotating shaft, so as to pour dirty water in the drinking tray assembly into the dirty water tank.

2. The pet water fountain with clean and dirty water separation according to claim 1, wherein the drinking tray assembly comprises a bottom shell and a water holding tray, with the water holding tray mounted on the bottom shell, and the rotating shaft is connected to the bottom shell, extends into the shell, and is rotatably mounted on the shell.

3. The pet water fountain with clean and dirty water separation according to claim 2, further comprising a fixed block arranged inside the shell and a rotating block rotatably connected to the fixed block, wherein the shell has a first through-hole portion at a position corresponding to the fixed block, the rotating block passing through the first through-hole portion, and the rotating shaft being sleeved on the rotating block.

4. The pet water fountain with clean and dirty water separation according to claim 3, further comprising a locking block for locking the rotating shaft from the outside, wherein the locking block is in a flat-axle shape, and the rotating shaft has a flat hole for mounting the rotating block.

5. The pet water fountain with clean and dirty water separation according to claim 4, wherein the shell further has a second through-hole portion, the rotating sleeve is inserted into the second through-hole portion, and the second through-hole portion is located on a side of the first through-hole portion.

6. The pet water fountain with clean and dirty water separation according to claim 5, wherein the water outlet tube is located on a side of the first through-hole portion away from the second through-hole portion.

7. The pet water fountain with clean and dirty water separation according to claim 1, wherein a water outlet of the water outlet tube is in a shape of a straight line.

8. The pet water fountain with clean and dirty water separation according to claim 2, wherein the dirty water tank comprises a bottom cylinder and a cover plate, and the cover plate is placed on the bottom cylinder; the cover plate comprises a flat plate portion and a concave plate portion, and the concave plate portion is recessed downward to provide a space for the drinking tray assembly to rotate; and the concave plate portion has a plurality of water leakage grooves.

9. The pet water fountain with clean and dirty water separation according to claim 8, wherein a portion of the bottom shell abuts against the flat plate portion.

10. The pet water fountain with clean and dirty water separation according to claim 1, further comprising a control board and a touch screen, wherein the control board is arranged inside the shell and is electrically connected to the driving member; and the touch screen is electrically connected to the control board and is located outside the shell for an operation by a user.

* * * * *